United States Patent Office 2,734,051
Patented Feb. 7, 1956

2,734,051
ASYMMETRICAL CUPRIFEROUS POLYAZO DYESTUFFS

Ernst Iselin, Dornach, near Basel, Switzerland, assignor to Sandoz, A. G., Basel, Switzerland No Drawing. Application December 10, 1952, Serial No. 325,209

Claims priority, application Switzerland December 18, 1951

6 Claims. (Cl. 260—145)

The present invention relates to valuable metalliferous polyazo dyestuffs which are characterized by ready solubility in water, by the fact that they dye cotton and fibers of regenerated cellulose in green to olive shades, and by very good fastness properties.

More particularly, the invention has especial relation to the copper complex compounds of the polyazo dyestuffs which, before conversion into the cupriferous state, correspond to the formula

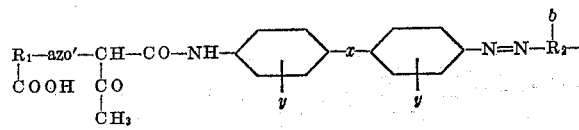

wherein $R_1$ is a radical of the benzene or naphthalene series, $R_2$ is also a radical of the benzene or naphthalene series, $x$ is the simple diphenyl linkage or the —CH=CH—, the —NH.CO—, the —CO.NH— or the —NH.CO.NH— bridge, $y$ is a hydrogen atom or a carboxy or sulfonic acid group, $v$ is a hydrogen atom or the hydroxy, the amino, a lower alkylamino, a cycloalkylamino, a mononuclear arylamino or an acylamino group, $w$ is in orthoposition relative to $v$ and represents a hydrogen atom, an —N=N— aryl group or an —N=N- pyrazolone group, $b$ is in ortho-position relative to —azo″— and represents a methoxy or ethoxy group, $n$ is one of the integers 1, 2 and 3, and wherein —OH is in ortho-position and —N=N— is in para-position relative to —azo″—, and —COOH is in ortho-position relative to —azo′—.

These valuable metalliferous polyazo dyestuffs are obtained by coupling one mol of a diazotized substituted or unsubstituted ortho-aminocarboxylic acid of the benzene or naphthalene series with one mol of an acetoacetylamino compound of the formula

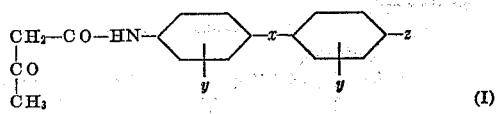

wherein $x$ and $y$ have the previously-recited significances and $z$ stands for amino, nitro or a readily-saponifiable acylamino group, if necessary converting the nitro or acylamino group into the amino group, diazotizing the so-obtained aminoazo compound, combining the product with one mol of an amine of the benzene or naphthalene series which couples in para-position to the amino group and carries, in ortho-position to the amino group, a group which is capable of metal complex formation, further diazotizing the resultant disazo dyestuff, coupling the thus-obtained diazotized product in ortho-position to the hydroxyl group with one mol of a hydroxynaphthalene of the formula

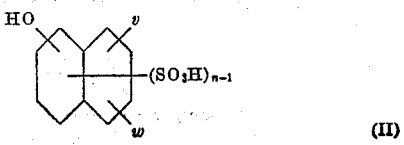

wherein one of the positions ortho to the hydroxyl group is capable of coupling, and wherein $n$, $v$, and $w$ have the previously-recited significances, $w$ being ortho-positioned relative to $v$, and finally treating the produced polyazo dyestuff with metal-yielding agent.

According to an alternative mode of procedure, one mol of the diazo compound from an amine of the formula

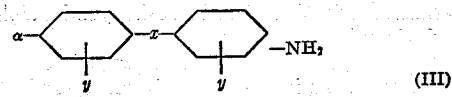

wherein $\alpha$ is the nitro group or a saponifiable acylamino group, and $x$ and $y$ have the previously-recited significances, is coupled with one mol of an amine of the benzene or naphthalene series which couples in para-position to the amino group and carries, in ortho-position to the amino group, a group which is capable of metal complex formation, diazotizing the so-obtained aminoazo compound and then coupling the diazotized product with one mol of a hydroxynaphthalene compound of Formula II

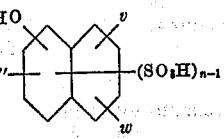

in ortho-position to the hydroxy group, converting the nitro or acylamino group in the resultant disazo dyestuff into the amino group, condensing the aminodisazo dyestuff with diketene, coupling the condensation product with one mol of a diazotized substituted or unsubstituted ortho-aminocarboxylic acid of the benzene or naphthalene series, and treating the resultant polyazo dyestuff with metal-yielding agent.

Metalliferous polyazo dyestuffs, obtainable according to the two described processes and in which $x$ is the —NH.CO— group, can also be prepared by coupling one mol of a diazotized substituted or unsubstituted ortho-aminocarboxylic acid of the benzene or naphthalene series with one mol of an acetoacetylamino compound of the formula

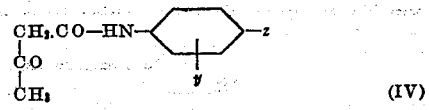

wherein $y$ and $z$ have the previously-recited significances, if necessary converting the nitro or acylamino group into the amino group, reacting the aminoazo compound with one mol of an acid halide of the formula

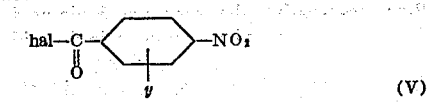

wherein hal is Cl or Br and $y$ has the previously-recited significance, converting the nitro group into the amino group, diazotizing the so-obtained aminoazo compound, coupling the diazotized product with one mol of an amine of the benzene or naphthalene series which couples in para-position to the amino group and carries, in ortho-position to the amino group, a group which is capable of metal complex formation, further diazotizing the resultant disazo dyestuff, coupling the thus further diazotized product with one mol of a hydroxynaphthalene of Formula II in ortho-position to the hydroxy group, and treating the polyazo dyestuff with metal-yielding agent.

Illustrative of the acetoacetylamino compounds of Formula I for use in the first process embodiment above described are:

4-acetoacetylamino-4′-nitrostilbene-2,2′-disulfonic acid,
4-acetoacetylamino-4′-aminostilbene-2,2′-disulfonic acid, 4-acetoacetylamino-4'-carbethoxyaminostilbene-2,2'-disulfonic acid,
4-acetoacetylamino-4'-oxalylaminostilbene-2,2'-disulfonic acid,
4-acetoacetylamino-4'-aminodiphenyl,
4-acetoacetylamino-4'-carbethoxyaminodiphenyl,
4-acetoacetylamino-4'-aminodiphenyl-3'-sulfonic acid,
4-acetoacetylamino-4'-oxalylaminodiphenyl-3'-sulfonic acid,
4-acetoacetylamino-4'-carbomethoxyaminodiphenyl-3-sulfonic acid,
4-acetoacetylamino-1-(4'-aminobenzoyl)-aminobenzene,
4-acetoacetylamino-1-(4'-nitrobenzoyl)-aminobenzene,
4-acetoacetylamino-1-(4'-aminobenzoyl)-aminobenzene-2-sulfonic acid,
4-acetoacetylamino-1-(4'-aminobenzoyl)-aminobenzene-2-carboxylic acid,
4-amino-1-(4'-acetoacetylaminobenzoyl)-aminobenzene,
4-amino-1-(4'-acetoacetylaminobenzoyl)-aminobenzene-3-sulfonic acid,
4-amino-1-(4'-acetoacetylaminobenzoyl)-aminobenzene-3-carboxylic acid,
4-acetoacetylamino-4'-amino-1,1'-diphenylurea,
4-acetoacetylamino-4'-nitro-1,1'-diphenylurea,
4-acetoacetylamino-4'-amino-1,1'-diphenylurea-3'-sulfonic acid, etc.

The compounds of Formula I are prepared by reacting one mol of diketene with one mol of an amine of the formula

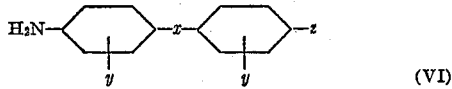

(VI)

wherein $x$, $y$ and $z$ have the previously-recited significances, in aqueous solution or in an inert organic solvent at temperatures of 20 to 60° C. Diketene is stable to water at temperatures of 20 to 60° C., but reacts readily with primary amines. The reaction takes place with special ease if the amine reactant is unsubstituted in the ortho-positions. On the other hand, in those cases where, for example, a sulfonic acid group stands in ortho-position to the amino group, the reaction does not take place or proceeds only with difficulty. This property makes it possible to react diamines, which have a sulfonic acid group in ortho-position to an amino group, with diketene in such manner that only the one free amino group reacts.

Illustrative of ortho-aminocarboxylic acids of the benzene or naphthalene series, which may be used in all embodiments of the processes for preparing the products of the present invention, are:

2-aminobenzene-1-carboxylic acid,
2-amino-1-carboxybenzene-4-sulfonic acid,
2-amino-1-carboxybenzene-5-sulfonic acid,
2-amino-5-nitrobenzene-1-carboxylic acid,
2-aminonaphthalene-3-carboxylic acid, etc.

Illustrative of the amines of the benzene or naphthalene series which couple in para-position to the amino group and carry, in ortho-position to the amino group, a group which is capable of metal complex formation, are:

1-amino-2-methoxybenzene,
1-amino-2-methoxy-5-methylbenzene,
1-amino-2,5-dimethoxybenzene,
1-amino-2-methoxynaphthalene,
1-amino-2-methoxynaphthalene-6-sulfonic acid,
1-amino-2-ethoxynaphthalene-6-sulfonic acid, etc.

Illustrative of the hydroxynaphthalene compounds of Formula II for use in preparing the dyestuffs of the present invention are:

1-hydroxynaphthalene,
2-hydroxynaphthalene,
1-hydroxynaphthalene-3-sulfonic acid,
1-hydroxynaphthalene-4-sulfonic acid,
1-hydroxynaphthalene-5-sulfonic acid,
1-hydroxynaphthalene-3,6-disulfonic acid,
1-hydroxynaphthalene-3,8-disulfonic acid,
2-hydroxynaphthalene-4-sulfonic acid,
2-hydroxynaphthalene-6-sulfonic acid,
2-hydroxynaphthalene-7-sulfonic acid,
1-hydroxy-6-aminonaphthalene-3-sulfonic acid,
1-hydroxy-6-N-methylaminonaphthalene-3-sulfonic acid,
1-hydroxy-6-N-cyclohexylaminonaphthalene-3-sulfonic acid,
1-hydroxy-6-N-phenylaminonaphthalene-3-sulfonic acid,
1-hydroxy-6-N-phenylaminonaphthalene-3,4'-disulfonic acid,
1-hydroxy-6-N-(3'-carboxy-phenylamino)-naphthalene-3-sulfonic acid,
1-hydroxy-6-N-(4'-carboxy-phenylamino)-naphthalene-3-sulfonic acid,
1-hydroxy-6-acetylaminonaphthalene-3-sulfonic acid,
1-hydroxy-6-benzoylaminonaphthalene-3-sulfonic acid,
1-hydroxy-6-aminonaphthalene-3,5-disulfonic acid,
1-hydroxy-7-aminonaphthalene-3-sulfonic acid,
1-hydroxy-7-acetylaminonaphthalene-3-sulfonic acid,
1-hydroxy-7-N-phenylaminonaphthalene-3-sulfonic acid,
1-hydroxy-8-aminonaphthalene-5-sulfonic acid,
1-hydroxy-8-acetylaminonaphthalene-5-sulfonic acid,
1-hydroxy-8-aminonaphthalene-3,6-disulfonic acid,
1-hydroxy-8-acetylaminonaphthalene-3,6-disulfonic acid,
1,8-dihydroxynaphthalene-3,6-disulfonic acid,
1,6-dihydroxy-5-(2'-carboxybenzene-1'-azo)-naphthalene-3-sulfonic acid,
1,6-dihydroxy-5-(4'-nitro-2'-carboxybenzene-1'-azo)-naphthalene-3-sulfonic acid,
1,6-dihydroxy-5-(2'-carboxybenzene-1'-azo)-naphthalene-3,5'-disulfonic acid,
1,6-dihydroxy-5-(2'-hydroxybenzene-1'-azo)-naphthalene-3,5'-disulfonic acid,
1,6-dihydroxy-5-(2'-hydroxybenzene-1'-azo)-naphthalene-3,4'-disulfonic acid,
1,5-dihydroxy-6-(2'-hydroxynaphthalene-1'-azo)-naphthalene-3,4'-disulfonic acid,
1,5-dihydroxy-6-(2'-hydroxynaphthalene-1'-azo)-naphthalene-3,6'-disulfonic acid,
1,5-dihydroxy-6-(1'-hydroxynaphthalene-2'-azo)-naphthalene-3,4'-disulfonic acid,
1,5-dihydroxy-6-(1'-hydroxynaphthalene-2'-azo)-naphthalene-3,3',6'-trisulfonic acid,
1,5-dihydroxy-6-(1'-phenyl-3'-methyl-5'-pyrazolone-4'-azo)-naphthalene-3,4''-disulfonic acid,
1-hydroxy-6-amino-5-(benzene-1'-azo)-naphthalene-3-sulfonic acid,
1-hydroxy-6-amino-5-(2'-carboxybenzene-1'-azo)-naphthalene-3-sulfonic acid,
1-hydroxy-6-amino-5-(4'-nitro-2'-carboxybenzene-1'-azo)-naphthalene-3-sulfonic acid,
1-hydroxy-6-amino-5-(benzene-1'-azo)-naphthalene-3,3'-disulfonic acid,
1-hydroxy-6-amino-5-(benzene-1'-azo)-naphthalene-3,4'-disulfonic acid, etc.

In so far as the aforesaid hydroxynaphthalene compounds are capable of metal complex formation, they may be coupled in metallized form with the diazotized aminodisazo dyestuff.

Illustrative of compounds of Formula III which may be used in the second aforedescribed process embodiment are:

4-amino-4'-nitrostilbene-2,2'-disulfonic acid,
4-amino-4'-acetylaminostilbene-2,2'-disulfonic acid,
4-amino-4'-carbethoxyaminostilbene-2,2'-disulfonic acid,
4-amino-4'-acetylaminodiphenyl-3-sulfonic acid,
4-amino-4'-carbomethoxyaminodiphenyl-3-sulfonic acid,
4-amino-(4'-nitrobenzoyl)-aminobenzene,
4-amino-(4'-nitrobenzoyl)-aminobenzene-3-sulfonic acid,
4-amino-(4'-carboethoxyaminobenzoyl)-aminobenzene-3-sulfonic acid, 4-oxylamino-(4'-aminobenzoyl)-aminobenzene,
4-carbomethoxyamino - (4' - aminobenzoyl) - aminobenzene, etc.

Acetoacetylamino compounds of Formula IV which may be used according to the third aforedescribed process for preparing the compounds of the present invention comprise among others:

4-amino-1-acetoacetylaminobenzene,
4-amino-1-acetoacetylaminobenzene-3-sulfonic acid,
4-carbethoxyamino-1-acetoacetylaminobenzene,
4-oxylamino-1-acetoacetylaminobenzene,
4-nitro-1-acetoacetylaminobenzene, etc.

Suitable acid halides of Formula V comprise, inter alia, 4-nitrobenzoyl chloride and 4-nitrobenzoyl bromide.

The preparation of the polyazo dyestuffs of this invention according to the first process embodiment hereinbefore described may advantageously be carried out by coupling the diazo compound of the substituted or unsubstituted orthoaminocarboxylic acid of the benzene or naphthalene series in a weak acid or weak alkaline medium with the acetoacetylamino compound of Formula I. In those cases where z is an amino group, further diazotization can be carried out directly. Where, however, z is an acylamino group, the latter must first be saponified, and this can be effected by heating in an acid or in an alkaline medium. Where z is a nitro group, it has to be converted into the amino group, and care has to be taken in this regard not to split the azo bridge. The reduction is advantageously carried out with sodium sulfide while heating gently.

Upon completion of the diazotization, the aminoazo compound is coupled in an alkaline or weak acid medium, preferably one made alkaline with sodium carbonate or made acid with acetic acid or formic acid, with the amine of the benzene or naphthalene series which couples in para-position to the amino group and carries, in ortho-position to the amino group, a group which is capable of metal complex formation, whereby the corresponding disazo dyestuff is produced.

The coupling of the diazotized aminodisazo dyestuff with the hydroxynaphthalene compound of Formula II is preferably carried out in weak alkaline medium, for example sodium bicarbonate, potassium bicarbonate or ammonia, and if desired in the presence of a tertiary organic base, such as pyridine, quinoline or the like.

The conversion of the polyazo dyestuffs into their metal complex compounds is carried out according to conventional metallizing procedures. Thus, the following methods may advantageously be employed: heating of the aqueous dyestuff paste or solution with metal-yielding agents in the presence of an alkali metal salt of a low molecular aliphatic carboxylic acid or heating of the aqueous solution with a complex metal salt. Suitable metals are copper and nickel.

The preparation of the polyazo dyestuffs according to the second process embodiment is carried out in the manner hereinbefore outlined.

According to the third process embodiment, the reaction of the free amino group of the aminoazo compound—obtained by coupling a diazotized ortho-aminocarboxylic acid of the benzene or naphthalene series with the acetoacetylamino compound of Formula IV—with the acid halide of Formula V can be carried out in aqueous or organic solution or in a mixture of solvents. The presence of an acid-binding agent such, for example, as an alkali metal hydroxide or carbonate or bicarbonate or an organic base, has an accelerating effect on the reaction.

The following examples set forth, by way of illustration, representative embodiments of the invention. In these examples, the parts are parts by weight, the percentages are also by weight, and the temperatures are in degrees centigrade.

Example 1

13.7 parts of 2-aminobenzene-1-carboxylic acid are diazotized in 120 parts of water and the diazo suspension is added to a solution, rendered alkaline with sodium carbonate, of 48.4 parts of 4-acetoacetylamino-4'-nitrostilbene-2,2'-disulfonic acid in 400 parts of water. Upon completion of the coupling, the monoazo dyestuff is isolated and stirred into 1000 parts of water. Then, in the course of 2 hours and at a temperature of 35–40°, a solution of 15.8 parts of sodium sulfide in 200 parts of water is added dropwise, the mixture stirred for two more hours at 40°, and the formed dyestuff isolated. The dyestuff is then diazotized by dissolving it in 400 parts of water, adding 25 parts of concentrated hydrochloric acid, and then, at 10°, adding a solution of 6.9 parts of sodium nitrite in 50 parts of water. Upon completion of the diazotization, 25 parts of crystalline sodium acetate are added to the diazo mass which is then coupled with 27.5 parts of the sodium salt of 1-amino-2-methoxynaphthalene-6-sulfonic acid in solution in 200 parts of water. Upon completion of the coupling, the resultant disazo dyestuff is filtered off, stirred into 600 parts of water and after the addition of 6.9 parts of sodium nitrite, diazotized by pouring the suspension into a mixture of 40 parts of concentrated hydrochloric acid and 160 parts of an ice-and-water mixture. The thus-prepared diazodisazo compound is filtered off and added to a solution of 24.6 parts of the sodium salt of 1-hydroxynaphthalene-4-sulfonic acid in 200 parts of water and 200 parts of pyridine. The resultant trisazo dyestuff is isolated.

For coppering purposes, the trisazo dyestuff is dissolved in 2000 parts of water at 85–90°. After the addition of 10 parts of sodium carbonate, there is run in, within a period of 30 minutes, the complex copper salt solution prepared by mixing a solution of 50 parts of crystallized copper sulfate in 250 parts of water with 90 parts of an aqueous ammonia solution of 25% strength. The mixture is boiled under reflux for 12 hours, and the dyestuff then salted out and isolated. It corresponds to the formula

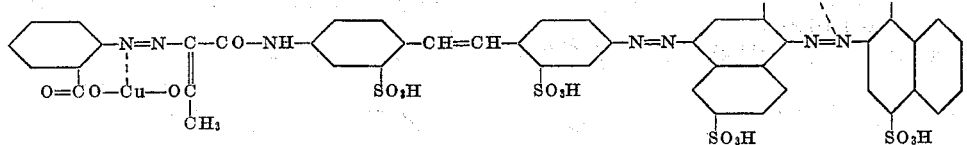

and is a dark powder which dissolves in water to form a green solution and in concentrated sulfuric acid to form an olive-green solution, and dyes cotton and fibers of regenerated cellulose in vivid olive shades of outstanding fastness to light and of excellent fastness to washing.

Example 2

21.7 parts of 2-amino-1-carboxybenzene-5-sulfonic acid are diazotized in 300 parts of water, and the diazo suspension coupled with 45.4 parts of 4-acetoacetylamino-4'-aminostilbene-2,2'-disulfonic acid in solution in 400 parts of water, rendered alkaline by means of sodium carbonate. After completion of the coupling the formed monoazo dyestuff is filtered and then dissolved in 400 parts of water. 25 parts of concentrated hydrochloric acid are added to the solution, after which diazotization is effected at 10° by means of a solution of 6.9 parts of sodium nitrite in 50 parts of water. The diazo solution is then poured at 10° into a solution of 29.1 parts of the potassium salt of 1-amino-2-methoxynaphthalene-6-sulfonic acid in 400 parts of water containing 20 parts of sodium carbonate. Upon completion of the coupling, the disazo dystuff is isolated, stirred into 600 parts of water and, after the addition of 6.9 parts of sodium nitrite, diazotized by pouring the dyestuff solution into a mixture of 40 parts of concentrated hydrochloric acid and 160 parts of a mixture of ice and water. The formed diazodisazo compound is filtered off, and the thus-obtained paste is introduced at 10° into a solution of 36.5 parts of the sodium salt of 2-benzoylamino-5-hydroxy-naphthalene-7-sulfonic acid in 200 parts of water, with addition of 10 parts of sodium bicarbonate and 200 parts of pyridine base mixture. The resultant trisazo dyestuff is isolated. The copper complex thereof, prepared after the manner set forth in Example 1, corresponds to the formula fibers of regenerated cellulose in green shades of very good fastness to light and to washing.

The 4-acetoacetylamino-4'-aminodiphenyl-3'-sulfonic acid, used in this example, is obtained by condensation of 1 mol of diketene with 1 mol of the sodium salt of 4,4'-diamino-1,1'-diphenyl-3'-sulfonic acid in aqueous medium in the presence of sodium carbonate.

Example 4

13.7 parts of 2-aminobenzene-1-carboxylic acid are diazotized in 150 parts of water and the diazo suspension coupled with 48.4 parts of 4-acetoacetylamino-4'-amino-1,1'-diphenyl-3'-sulfonic acid in solution in 500

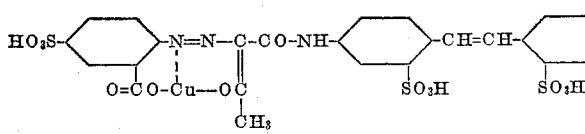
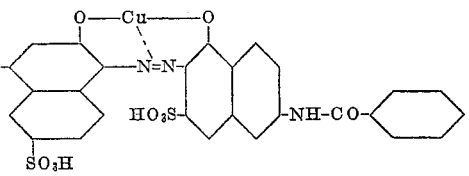

and is a dark powder which dissolves in water with formation of a green solution and in concentrated sulfuric acid with formation of a brown-green solution, and dyes cotton and fibers of regenerated cellulose in vivid olive-green shades of very good fastness properties.

Example 3

21.7 parts of 2-amino-1-carboxybenzene-5-sulfonic acid are diazotized in 250 parts of water and the diazo suspension is coupled with 37.0 parts of the sodium salt of 4-acetoacetylamino-4'-amino-1,1'-diphenyl-3'-sulfonic acid in solution in 400 parts of water. The resultant aminoazo dyestuff is separated, stirred into 500 parts of water, and the suspension, after the addition of 7 parts of sodium nitrite, introduced into a mixture of 30 parts of concentrated hydrochloric acid and 210 parts of ice. After stirring for four hours at 10°, the diazotization is completed. The diazo suspension is poured at 10° into a solution of 27.5 parts of the sodium salt of 1-amino-2-methoxynaphthalene-6-sulfonic acid in 400 parts of water, with the addition of 25 parts of sodium carbonate. Upon completion of the coupling, the disazo dyestuff is isolated, stirred into 600 parts of water and after the addition of 7 parts of sodium nitrite, diazotized at 10° by introducing the suspension into 30 parts of concentrated hydrochloric acid and 200 parts of ice.

parts of water, rendered alkaline with sodium bicarbonate. The obtained aminoazo dyestuff is diazotized after the manner described in Example 3, the diazo compound coupled with 27.5 parts of the sodium salt of 1-amino-2-methoxynaphthalene-6-sulfonic acid, the aminodiazo dyestuff stirred into 600 parts of water and the obtained suspension, after the addition of 7 parts of sodium nitrite, introduced at 10° into a mixture of 30 parts of concentrated hydrochloric acid and 200 parts of ice. The diazodisazo compound is filtered off and the thus-obtained paste is coupled at 10° with 51.2 parts of the sodium salt of 1,6-dihydroxy-5-(2'-carboxybenzene-1'-azo)-naphthalene-3,5'-disulfonic acid in solution in 300 parts of water and 300 parts of pyridine base mixture, whereupon the formed tetrakisazo dyestuff is promptly precipitated and isolated.

For coppering, the last-named dyestuff is dissolved in 2500 parts of water. After the addition of 15 parts of sodium carbonate, there is run into the dyestuff solution, at 85–95° in the course of 20 minutes, the ammoniacal-copper oxide solution obtained by mixing a solution of 75 parts of crystalline copper sulfate in 500 parts of water with 150 parts of an aqueous ammonia solution of 25% strength. The metallization mass is boiled for 8 hours under reflux, after which the dyestuff, which corresponds to the formula

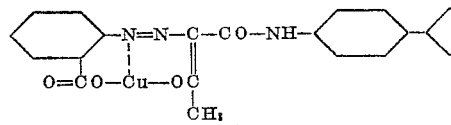
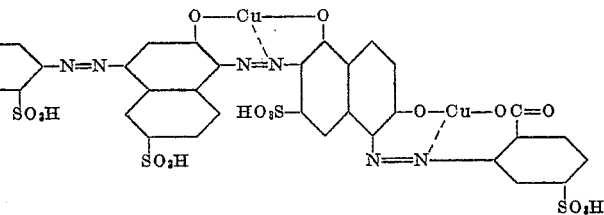

The diazodisazo dyestuff is filtered off and the thus-obtained paste is added at 10° to a solution of 24.6 parts of the sodium salt of 2-hydroxynaphthalene-4-sulfonic acid in 200 parts of water and 200 parts of pyridine. The formed trisazo dyestuff is isolated.

Coppering of the said trisazo dyestuff is effected after the manner described in Example 1. A dark powder is obtained, which corresponds to the formula is isolated and dried. It is a dark powder which dissolves in water with formation of a green solution and in concentrated sulfuric acid with formation of a gray-green solution, and dyes cotton and fibers of regenerated cellulose in olive shades of good fastness to washing and to light.

The aforementioned 1,6-dihydroxy-5-(2'-carboxybenzene-1'-azo)-naphthalene-3,5'-disulfonic acid can be prepared by coupling diazotized 1-amino-2-carboxybenzene-

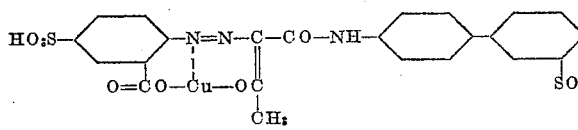
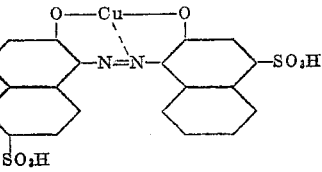

and dissolves in water with formation of an olive-green solution and in concentrated sulfuric acid with formation of a gray-green solution, and which dyes cotton and 5-sulfonic acid with 1-hydroxy-6-aminonaphthalene-3-sulfonic acid in acid medium, diazotizing the obtained aminoazo compound and boiling the diazoazo compound.

Example 5

The aminoazo dyestuff obtained by coupling 18.9 parts of diazotized 2-amino-1-carboxybenzene-4-sulfonic acid with 34.8 parts of 4-acetoacetylamino-4'-amino-1,1'-diphenyl-3'-sulfonic acid, is diazotized after the manner described in Example 4. The diazo suspension is poured at 10° into a solution of 21.7 parts of 1-amino-2-methoxy-naphthalene, 12.0 parts of concentrated hydrochloric acid and 400 parts of water. By the addition of 40 parts of crystalline sodium acetate, the pH value of the coupling solution is maintained between 4 and 4.5. Upon completion of the coupling, the dyestuff solution is made alkaline with sodium carbonate and the disazo dyestuff isolated therefrom. The latter is stirred into 600 parts of water, and 7 parts of sodium nitrite are added to the suspension. The latter is then added at 10° to a mixture of 30 parts of concentrated hydrochloric acid and 200 parts of ice. The resultant diazodisazo dyestuff is filtered off and the thus-obtained paste is introduced at 10° into a solution of 30.4 parts of 1-hydroxynaphthalene-3,8-disulfonic acid in 300 parts of water to which has been added 300 parts of pyridine and 20 parts of sodium bicarbonate, whereupon the formation of trisazo dyestuff takes place rapidly, after which the dyestuff is isolated and dried.

Coppering of the said dyestuff is carried out after the manner described in Example 1. The resultant copper complex compound, which corresponds to the formula

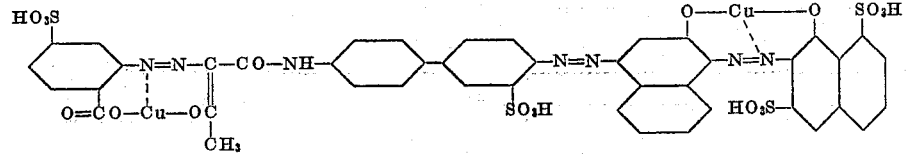

is a dark powder which dissolves in water with formation of a green solution, and which dyes cotton and fibers of regenerated cellulose in oil shades of good fastness to washing and to light.

Example 6

21.7 parts of 2-amino-1-carbonxybenzene-5-sulfonic acid are diazotized in 200 parts of water and the diazo suspension coupled with 24.4 parts of the sodium salt of 1-nitro-4-acetoacetylaminobenzene in solution in 400 parts of water. Upon completion of the coupling, the monoazo dyestuff is isolated by filtration, stirred into 500 parts of water, and the nitro group reduced by the dropwise addition at 35–40° of a solution of 12.0 parts of sodium sulfide in 100 parts of water. The aminoazo dyestuff is isolated, dissolved in a mixture of 200 parts of water and 200 parts of acetone, and then, in the presence of 75 parts of sodium bicarbonate, admixed at 50° with a solution of 19.0 parts of 4-nitrobenzoyl chloride in 100 parts of acetone. The resultant dyestuff is again reduced with 12.0 parts of sodium sulfide, then diazotized with 6.9 parts of sodium nitrite and, at a pH value of 3.5 to 4.5, coupled with 27.5 parts of the sodium salt of 1-amino-2-methoxynaphthalene-6-sulfonic acid in 200 parts of water. Upon completion of the coupling, the disazo dyestuff is isolated, stirred into 600 parts of water, 7 parts of sodium nitrite added to the suspension and, at 10°, the mixture introduced into a mixture of 30 parts of concentrated hydrochloric acid and 200 parts of ice. The diazodisazo dyestuff is separated by filtration, and the filter cake introduced at 10° into a solution of 34.8 parts of the sodium salt of 1-hydroxynaphthalene-3,8-disulfonic acid in 200 parts of water and 200 parts of a pyridine base mixture, whereupon the resultant trisazo dyestuff is isolated and dried.

For coppering, the said trisazo dyestuff, in the form of the moist filter cake, is added at 80–90° into a melt of 50 parts of crystalline copper sulfate, 350 parts of crystalline sodium acetate and 100 parts of water. The melt is further heated and water is distilled therefrom until the temperature of 107–108° is reached. Boiling is then continued for 12 more hours under reflux, then water is slowly added until all mineral salts have been dissolved while the dyestuff remains undissolved, after which the latter is filtered off. After drying, it is a dark powder which corresponds to the formula

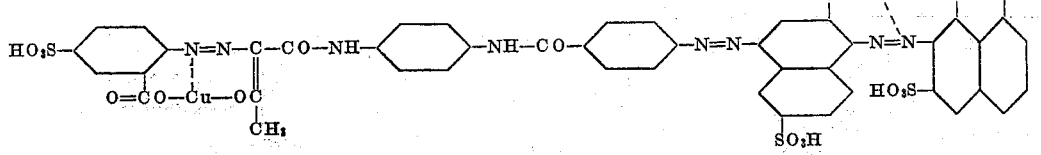

and dissolves in water with formation of a green solution, and which dyes cotton and fibers of regenerated cellulose in green shades of very good fastness properties.

The dyestuff can also be obtained by first preparing 1 - amino - 4 - (4' - acetoacetylaminobenzoyl) - aminobenzene, then coupling the latter with diazotized 2-amino-1-carboxy-benzene-5-sulfonic acid, further diazotizing the aminoazo dyestuff, coupling the diazotized product with 1-amino-2-methoxynaphthalene-6-sulfonic acid, and converting the thus-obtained intermediate into the end product according to the previously-given data of this example.

Example 7

21.7 parts of 2-amino-1-carboxybenzene-5-sulfonic acid are diazotized in 200 parts of water. The diazo suspension is coupled with 43.5 parts of the disodium salt of 1-amino-4-(4'-acetoacetylaminobenzoyl)-aminobenzene-2-sulfonic acid in solution in 400 parts of water, rendered alkaline with sodium carbonate. Upon completion of the coupling, the monoazo dyestuff is separated by filtration, stirred into 300 parts of water, and the suspension poured into a mixture of 30 parts of concentrated hydrochloric acid and 200 parts of ice, after the addition of 6.9 parts of sodium nitrite. Upon completion of the diazotization, the diazoazo compound is separated by filtration and then stirred into 400 parts of a mixture of ice and water, excess acid being buffered by the addition of sodium acetate until a pH value of 3.5–4.2 is reached. The suspension is mixed with a solution of 13.7 parts of 1-amino-2-methoxy-5-methylbenzene in 12 parts of concentrated hydrochloric acid and 200 parts of water, stirring being continued with cooling until the coupling is completed, whereupon the dyestuff is isolated and then again diazotized by the indirect method. The concentrated diazo pulp is added, while cooling with ice, to a mixture of 53.4 parts of the sodium salt of 1,5-dihydroxy - 6 - (2' - hydroxynaphthalene - 1' - azo) - naphthalene-3,6'-disulfonic acid, 200 parts of water, 200 parts of pyridine and 50 parts of sodium bicarbonate. The resultant tetrakisazo dyestuff is isolated and converted into the copper complex compound after the manner described in Example 4. The copper complex compound corresponds to the formula

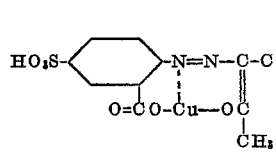

and is a dark powder which dissolves in water with formation of a green solution, and dyes cotton and fibers of regenerated cellulose in gray-green shades of good fastness properties.

The triasazo dyestuffs set forth in the following table possess, in the form of the copper complex compounds, valuable properties similar to the products described in

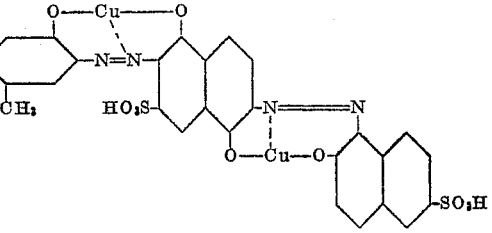

Examples 1–7. They can be prepared by the aforedescribed methods and dye coton and fibers of regenerated cellulose in green to olive shades.

| (1) Example No. | (2) Ortho-Aminocarboxylic Acid of the Benzene or Naphthalene series | (3) Acetoacetylamino Compound of the Formula (I) | (4) Amine of the Benzene or Naphthalene Series which Couples in Paraposition to the Amino Group and having, in Ortho-Position to the Amino Group, a Group Capable of Metal Complex Formation | (5) Hydroxynaphthalene Compound of Formula (II). |
|---|---|---|---|---|
| 8 | 2-aminobenzene-1-carboxylic acid. | 4-acetoacetyl-amino-4'-aminostilbene-2,2'-disulfonic acid. | 1-amino-2-methoxynaphthalene-6-sulfonic acid. | 2-hydroxynaphthalene-4-sulfonic acid. |
| 9 | do | do | do | 1-hydroxynaphthalene-3,6-disulfonic acid. |
| 10 | do | do | do | 1-hydroxynaphthalene-3,8-disulfonic acid. |
| 11 | do | do | do | 2-hydroxynaphthalene-3,6-disulfonic acid. |
| 12 | do | do | do | 1-hydroxy-8-acetylaminonaphthalene-3,6-disulfonic acid. |
| 13 | do | do | do | 1-hydroxy-6-benzoylamino-3,5-disulfonic acid. |
| 14 | 2-aminonaphthalene-3-carboxylic acid. | do | do | 1-hydroxy-8-acetylaminonaphthalene-5-sulfonic acid. |
| 15 | 2-amino-1-carboxybenzene-5-sulfonic acid. | do | do | 1 hydroxynaphthalene-4-sulfonic acid. |
| 16 | do | do | do | 2-hydroxynaphthalene-4-sulfonic acid. |
| 17 | do | do | do | 2-hydroxynaphthalene-6-sulfonic acid. |
| 18 | do | do | do | 1-hydroxy-6-N-phenylaminonaphthalene-3-sulfonic acid. |
| 19 | do | do | do | 1-hydroxy-6-(4'-chloro)-benzoylaminonaphthalene-3-sulfonic acid. |
| 20 | do | do | do | 1-hydroxy-8-acetylaminonaphthalene-5-sulfonic acid. |
| 21 | do | do | do | 2-hydroxy-6-propionylaminonaphthalene-4-sulfonic acid. |
| 22 | do | do | 1-amino-2,5-diethoxybenzene | 1-hydroxynaphthalene-3,6-disulfonic acid. |
| 23 | do | do | do | 1-hydroxynaphthalene-3,8-disulfonic acid. |
| 24 | do | do | 1-amino-2,5-dimethoxybenzene. | 1-hydroxy-8-butyrylamino-naphthalene-3,6-disulfonic acid. |
| 25 | do | do | do | 1,8-dihydroxynaphthalene-3,6-disulfonic acid. |
| 26 | do | do | 1-amino-2-methoxy-5-methylbenzene. | 1,6-dihydroxy-5-(2'-hydroxy-benzene-1'-azo)-naphthalene-3,4'-disulfonic acid. |
| 27 | do | do | do | 1,5-dihydroxy-6-(1'-phenyl-3'-methyl-5'-pyrazolone-4'-azo)-naphthalene-3,4''-disulfonic acid. |
| 28 | do | 4-acetoacetylamino-4'-amino-1,1'-diphenyl-3'-sulfonic acid. | 1-amino-2-methoxynaphthalene-6-sulfonic acid. | 2-hydroxynaphthalene-6-sulfonic acid. |
| 29 | do | do | do | 1-hydroxynaphthalene-4-sulfonic acid. |
| 30 | do | do | do | 1-hydroxy-6-N-(4'-chloro)-phenylaminonaphthalene-3-sulfonic acid. |
| 31 | do | do | do | 1-hydroxy-6-aminonaphthalene-3-sulfonic acid. |
| 32 | do | do | do | 1-hydroxy-6-acetylamino-naphthalene-3-sulfonic acid. |
| 33 | do | do | do | 1-hydroxy-8-propionylamino-naphthalene-5-sulfonic acid. |
| 34 | do | do | do | 2-hydroxy-6-(4'-methyl)-benzoylaminonaphthalene-4-sulfonic acid. |
| 35 | 2-amino-1-carboxybenzene-4-sulfonic acid. | do | do | 1-hydroxynaphthalene-4-sulfonic acid. |
| 36 | do | do | do | 1-hydroxynaphthalene-6-N-cyclohexylaminonaphthalene-3-sulfonic acid. |
| 37 | do | do | do | 1-hydroxynaphthalene-6-N-(4'-methyl)-phenylamino-naphthalene-3-sulfonic acid. |
| 38 | do | 4-acetoacetylamino-1-(4'-aminobenzoyl)-aminobenzene. | do | 1-hydroxynaphthalene-3,6-disulfonic acid. |

| Example No. (1) | Ortho-Aminocarboxylic Acid of the Benzene or Naphthalene series (2) | Acetoacetylamino Compound of the Formula (I) (3) | Amine of the Benzene or Naphthalene Series which Couples in Paraposition to the Amino Group and having, in Ortho-Position to the Amino Group, a Group Capable of Metal Complex Formation (4) | Hydroxynaphthalene Compound of Formula (II). (5) |
|---|---|---|---|---|
| 39 | 2-amino-1-carboxybenzene-4-sulfonic acid. | 4-acetoacetylamino-1-(4'-aminobenzoyl)-aminobenzene. | 1-amino-2-methoxynaphthalene-6-sulfonic acid. | 2 - hydroxynaphthalene - 3,6 - disulfonic acid. |
| 40 | do | do | do | 2-hydroxynaphthalene - 6,8 - disulfonic acid. |
| 41 | do | do | do | 1-hydroxy-8-acetylaminonaphthalene-3,6-disulfonic acid. |
| 42 | 2-amino-1-carboxybenzene-5-sulfonic acid. | do | do | 1-hydroxy-6-aminonaphthalene-3,5-disulfonic acid. |
| 43 | do | do | do | 1,8 - dihydroxynaphthalene - 3,6 disulfonic acid. |
| 44 | do | 4-amino-1-(4'-acetoacetylaminobenzoyl)-aminobenzene-3-sulfonic acid. | 1-amino-2-ethoxy-naphthalene-6-sulfonic acid. | 1-hydroxy-6-N-phenylamino-naphthalene-3-sulfonic acid. |
| 45 | do | do | do | 1-hydroxy-8-acetylaminonaphthalene-5-sulfonic acid. |
| 46 | do | do | do | 1-hydroxynaphthalene - 4 - sulfonic acid. |
| 47 | do | do | do | 2-hydroxynaphthalene - 4 - sulfonic acid. |
| 48 | do | do | 1-amino-2-methoxynaphthalene. | 1 - hydroxynaphthalene - 3,6 - disulfonic acid. |
| 49 | do | do | do | 1,8 - dihydroxynaphthalene - 3,6-disulfonic acid. |
| 50 | do | do | 1-amino-2-ethoxynaphthalene. | 1 - hydroxy - 8 - aminonaphthalene-3,6-disulfonic acid. |
| 51 | do | 4-acetoacetylamino-4'-amino-1,1'-diphenylurea - 3' - sulfonic acid. | 1-amino-2-methoxynaphthalene-6-sulfonic acid. | 1-hydroxy-6-N-(4'-methyl)-phenylaminonaphthalene-3-sulfonic acid. |
| 52 | do | do | do | 1-hydroxy-6-acetylaminonaphthalene-3-sulfonic acid. |
| 53 | do | do | do | 1-hydroxy-8-acetylaminonaphthalene-5-sulfonic acid. |
| 54 | do | do | do | 1-hydroxynaphthalene - 4 - sulfonic acid. |
| 55 | do | do | do | 1 - hydroxynaphthalene - 3,6 - disulfonic acid. |
| 56 | do | do | do | 1-hydroxy - 8 - aminonaphthalene-3,6-disulfonic acid. |
| 57 | do | 4-amino-1-(4'-acetoacetylaminobenzoyl) - aminobenzene-3-carboxylic acid. | 1-amino-2-methoxy-5-methyl-benzene. | 1-hydroxy-6-N-phenyl-aminonaphthalene - 3,4' - disulfonic acid. |
| 58 | do | do | do | 1 - hydroxy - 6 - N - (3' - carboxy) - phenylamino-naphthalene-3-sulfonic acid. |
| 59 | do | 4 - acetoacetylamino - 1 - (4'-aminobenzoyl) - aminobenzene-2-carboxylic acid. | 1-amino-2-methoxynaphthalene-6-sulfonic acid. | 1-hydroxy-6-N-methylamino-naphthalene-3-sulfonic acid. |
| 60 | do | do | do | 1 - hydroxy - 6 - N - ethylamino - naphthalene-3-sulfonic acid. |
| 61 | do | 4-acetoacetylamino-4'-amino-1,1'-diphenyl. | do | 1-hydroxy-6-N-propylamino-naphthalene-3-sulfonic acid. |
| 62 | do | do | do | 1-hydroxy-6-N-phenylamino-naphthalene-3,3'-disulfonic aicd. |
| 63 | do | do | do | 1-hydroxy-6-N-(3'-methoxy)-phenylamino - naphthalene - 3-sulfonic acid. |
| 64 | do | do | do | 1-hydroxy-6-N-carbomethoxy-aminonaphthalene - 3 - sulfonic acid. |
| 65 | do | do | do | 1 - hydroxy - 6 - N - carbethoxy - aminonaphthalene - 3 - sulfonic acid. |
| 66 | do | do | do | 1-hydroxy - 6 - N - carbopropoxy-aminonaphthalene - 3 - sulfonic acid. |
| 67 | do | 4-acetoacetylamino-4'-amino-stilbene-2,2'-disulfonic acid. | 1-amino-2-methoxy-5-methyl-benzene. | 1,5 - dihydroxy - 6 - (1' - phenyl - 3' - methyl - 5' - pyrazolone - 4' - azo) - naphthalene - 3 - sulfonic acid. |
| 68 | do | do | do | 1,5-dihydroxy-6-[1'-(3''-chloro)-phenyl-3'-methyl-5'-pyrazolone-4'-azo] - naphthalene - 3-sulfonic acid. |

Formulae of representative dyestuffs of the foregoing table are:

*Ex. 18*

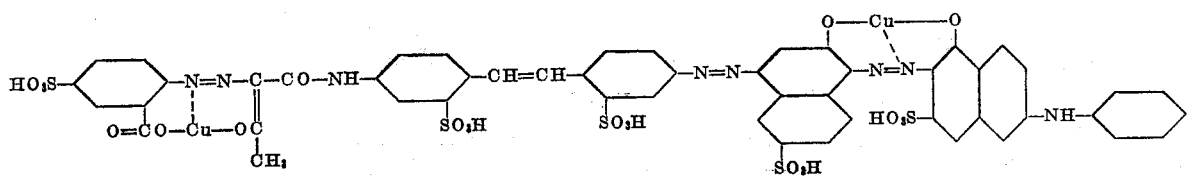

Ex. 26
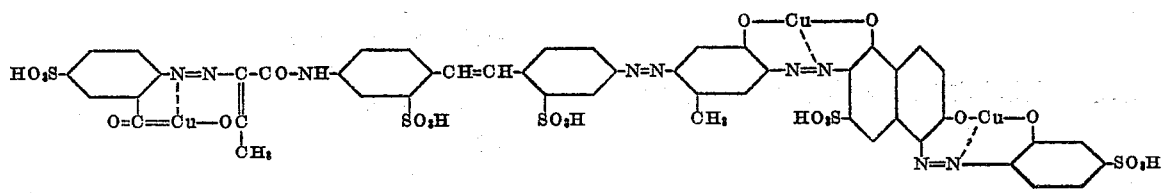
Ex. 27
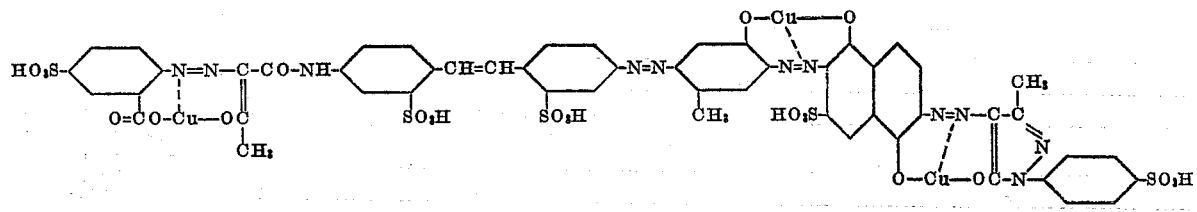
Ex. 29
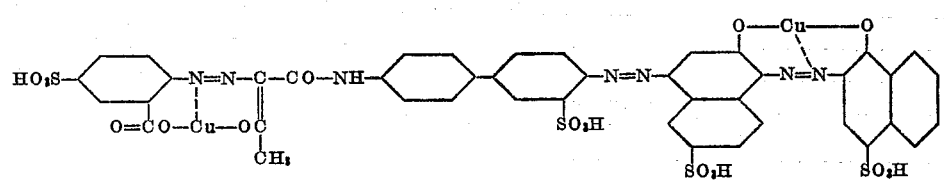
Ex. 45
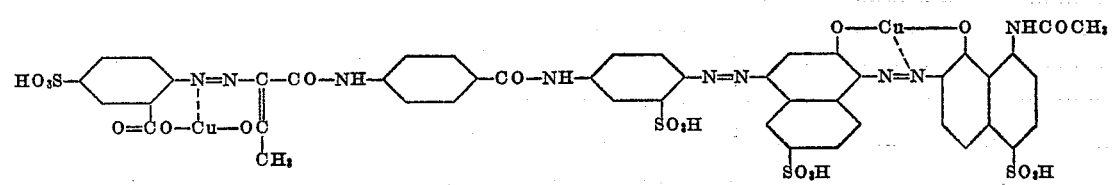
Ex. 51
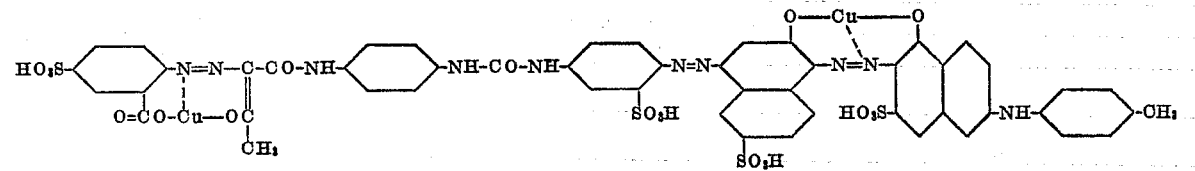
Ex. 57
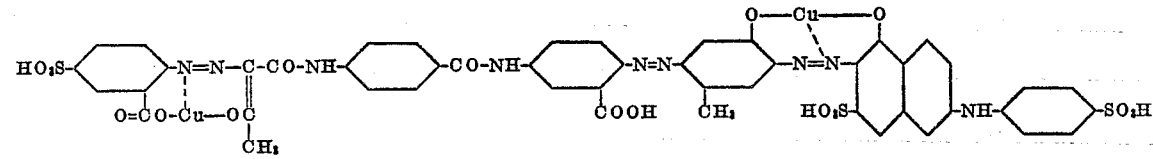
Ex. 59
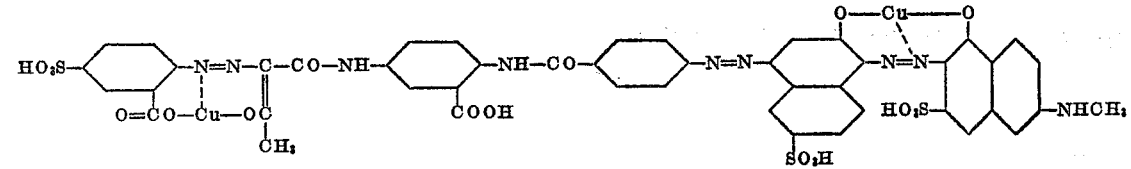
Ex. 65
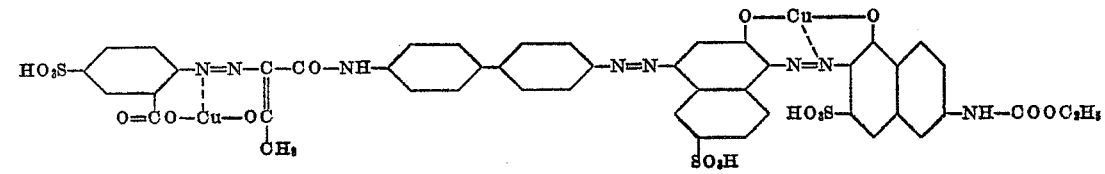

Example 69

5 parts of cotton are wetted in a dyebath containing 100 parts of lime-free water at 50°. There is then added to the dyebath a concentrated aqueous solution containing 0.1 part of dyestuff, after which the bath is heated to boiling in the course of a half hour, the boiling temperature being maintained for a further half hour. In the course of the dyeing process, 0.5 to 2 parts of sodium sulfate are added in the form of a concentrated aqueous solution. Upon completion of the dyeing process, the dyed material is allowed to cool to 50° in the bath, and is then rinsed and dried.

Having thus disclosed the invention, what is claimed is:

1. An asymmetrical copper complex compound of a polyazo dyestuff which corresponds before conversion into the copper complex compounds, to the formula

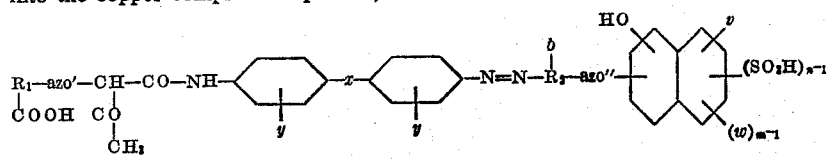

wherein $R_1$ stands for a radical of the benzene series, $R_2$ stands for a radical selected from the group consisting of radicals of the benzene and naphthalene series, $x$ stands for a member selected from the group consisting of the simple diphenyl linkage, the —CH=CH—, the —NH.CO—, the —CO.NH— and the —NH.CO.NH— bridge, $y$ stands for a member selected from the group consisting of the hydrogen atom, the carboxy and the sulfonic acid group, $v$ stands for a member selected from the group consisting of hydrogen, hydroxy, amino, lower alkyl amino, cycloalkylamino, mononuclear carbocyclic arylamino and acylamino groups, $w$ stands for a member in ortho-position to $v$ selected from the group consisting of —N—N— carbocyclic aryls and —N=N— pyrazolones, $b$ stands for a member in ortho-position to —azo"— selected from the group consisting of the methoxy and the ethoxy group, $n$ is one of the integrers 1, 2 and 3, $m$ is one of the integers 1 and 2, and wherein —OH stands in ortho-position and —N=N— in para-position to azo"—, and —COOH stands in ortho-position to —azo'—.

2. The asymmetrical cupriferous polyazo dyestuff of the formula

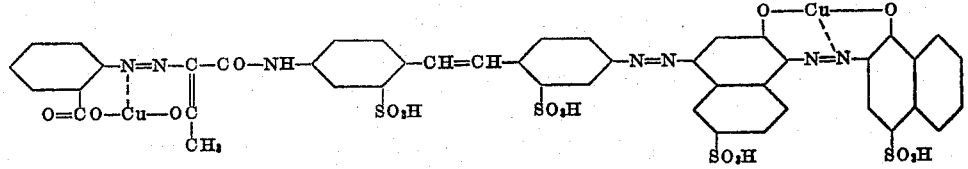

3. The asymmetrical cupriferous polyazo dyestuff of the formula

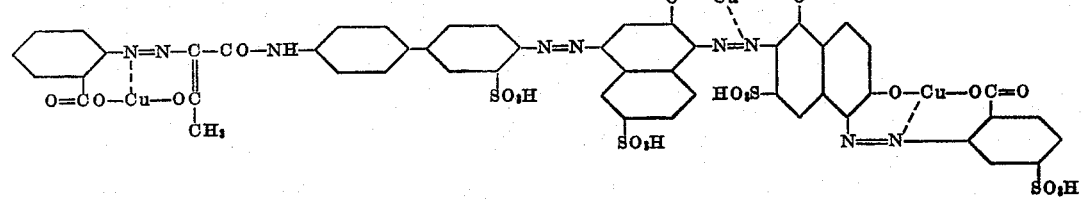

4. The asymmetrical cupriferous polyazo dyestuff of the formula

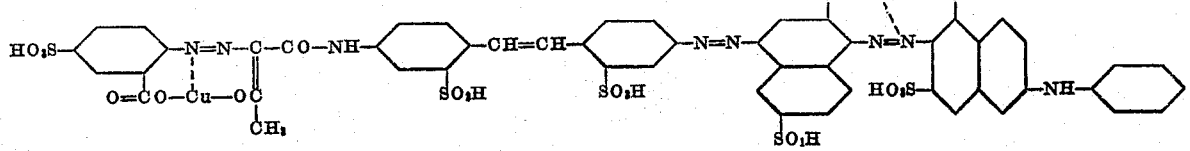

5. The asymmetrical cupriferous polyazo dyestuff of the formula

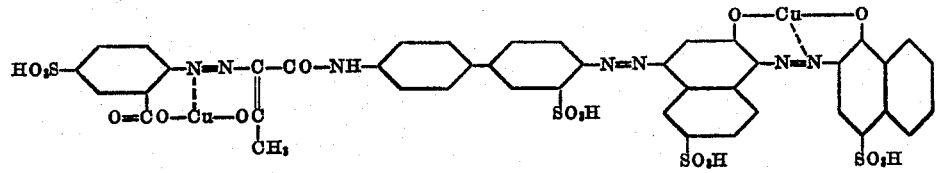

6. The asymmetrical cupriferous polyazo dyestuff of the formula

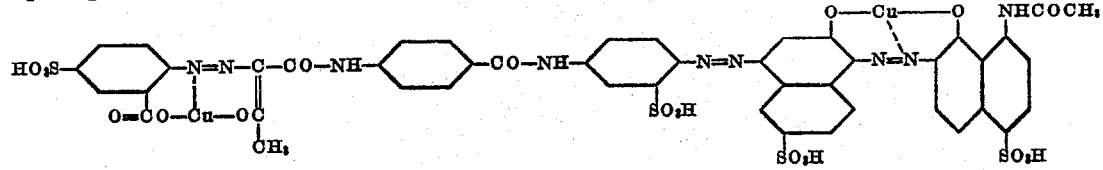

References Cited in the file of this patent

UNITED STATES PATENTS

| | | |
|---|---|---|
| 1,594,865 | Zitscher | Aug. 3, 1926 |
| 2,300,636 | Sieglitz et al. | Nov. 3, 1942 |